(12) United States Patent
Kim

(10) Patent No.: US 7,665,696 B2
(45) Date of Patent: Feb. 23, 2010

(54) STAND FOR DISPLAY DEVICE HAVING A LOCKING MEMBER TO FIX A CONNECTING MEMBER TO A BASE

(75) Inventor: Yun Joo Kim, Busan-si (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 11/702,066

(22) Filed: Feb. 5, 2007

(65) Prior Publication Data
US 2008/0185486 A1    Aug. 7, 2008

(30) Foreign Application Priority Data
Jul. 18, 2006    (KR) .................. 10-2006-0066745

(51) Int. Cl.
     *F16M 11/00*      (2006.01)

(52) U.S. Cl. .................... 248/176.1; 248/917; 248/918; 248/919; 248/920; 248/921; 248/922; 248/923

(58) Field of Classification Search ......... 248/917–923, 248/176.1, 229.12, 229.14, 229.22, 229.24, 248/228.5, 230.5, 231.61, 600, 607
See application file for complete search history.

(56) References Cited

U.S. PATENT DOCUMENTS

| | | | | |
|---|---|---|---|---|
| 5,485,793 A | * | 1/1996 | Crowell | 108/44 |
| 6,010,111 A | * | 1/2000 | Cho | 248/346.06 |
| 6,315,252 B1 | * | 11/2001 | Schultz | 248/160 |
| 6,366,452 B1 | * | 4/2002 | Wang et al. | 361/681 |
| 6,918,564 B2 | * | 7/2005 | Yen et al. | 248/404 |
| 7,236,354 B2 | * | 6/2007 | Hsu et al. | 361/681 |
| 7,389,963 B2 | * | 6/2008 | Cho et al. | 248/159 |
| 2004/0084588 A1 | * | 5/2004 | Liu et al. | 248/291.1 |
| 2006/0038092 A1 | * | 2/2006 | Choi | 248/121 |
| 2006/0126283 A1 | * | 6/2006 | Ho | 361/681 |
| 2006/0168865 A1 | * | 8/2006 | Watanabe | 40/745 |
| 2007/0221798 A1 | * | 9/2007 | Lin | 248/176.1 |
| 2007/0262210 A1 | * | 11/2007 | Oh et al. | 248/125.1 |
| 2007/0279850 A1 | * | 12/2007 | Chiang et al. | 361/681 |
| 2008/0117574 A1 | * | 5/2008 | Lee | 361/681 |

FOREIGN PATENT DOCUMENTS

KR    10-2007-0072073 A    7/2007

\* cited by examiner

*Primary Examiner*—J. Allen Shriver, II
*Assistant Examiner*—Nkeisha J Smith
(74) *Attorney, Agent, or Firm*—Birch, Stewart, Kolasch & Birch, LLP

(57) ABSTRACT

A stand for a display device includes a connecting member having a side connected to the display device, an insertion portion extending downward from the connecting member, a hook step formed on the insertion portion, a supporting member provided with a space in which the insertion portion is inserted, a base for fixing the supporting member, and a locking unit that is selectively aligned with the hook step to place the connecting member in a fixing or separable state in a state where the connecting member is disposed in the space.

19 Claims, 7 Drawing Sheets

STAND FOR DISPLAY DEVICE HAVING A LOCKING MEMBER TO FIX A CONNECTING MEMBER TO A BASE

BACKGROUND OF THE INVENTION

1. Field of the Invention

The present invention relates to a stand for a display device and, more particularly, to a stand for a display device, which can reduce a package size of the display device and can be easily separated and manipulated.

2. Description of the Related Art

Generally, in order to maintain a vertical erection of a display device, a stand should be provided. The stand functions to stably support the display device and provide an easy manipulation.

Therefore, a typical stand for the display device is provided with a plurality of hinges.

Meanwhile, in order to reduce the packaging costs of the display device, a variety of stands has been proposed. Korean Patent Application No. 10-2005-0136027 discloses such a stand that can reduce the packaging costs.

The stand disclosed in the application includes a base divided into front and rear bases that allow the display device rotates rearward.

However, even when the display device is designed to rotate rearward for the package, since the base is folded on a rear side of the display device after the package, a thickness of the packaged display device increases.

That is, a thickness of the package display device increases by a width of a hinge for rotating the base. Furthermore, since the base is located in a fixed location, a thickness of the display device increases.

When the thickness of the packaged display device increases, the number of the display devices that can be stored in an identical space and thus the transportation cost increases. To solve this problem, a stand that has a support and a base that can be completely separated from each other has been proposed. That is, the display device is packaged and delivered in a state where the base and the support are separated from each other.

In the above-described stand, since a process for assembling the support and the base is required after the display device is delivered, a stable operation of the stand after the base and the support are assembled should be provided. In addition, the assembling work can be easily done.

SUMMARY OF THE INVENTION

An object of the present invention is to provide a stand for a display device that substantially obviates one or more problems due to limitations and disadvantages of the related art.

An object of the present invention is to provide a stand for a display device, which can be easily assembled with the display device and provide a stable operation in use.

Another object of the present invention is to provide a stand for a display device, which can prevent the display device from shaking or damaged in use.

Still another object of the present invention is to provide a stand for a display device, which can reduce a package volume and thus reduce the transportation cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device including: a connecting member having a side connected to the display device; an insertion portion extending downward from the connecting member; a hook step formed on the insertion portion; a supporting member provided with a space in which the insertion portion is inserted; a base for fixing the supporting member; and a locking unit that is selectively aligned with the hook step to place the connecting member in a fixing or separable state in a state where the connecting member is disposed in the space.

In another aspect, there is provided a stand for a display device, including: a connecting member having a side supported on a lower end of the display device; a base for supporting the connecting member aligned; and a locking member separated from the base and fixing the connecting member to fix the display device with respect to the base, wherein the locking unit for changing a state of the connecting member into a locking state or a unlocking state by selectively engaging the connecting member in a state where the connecting member is aligned with the base.

In still another aspect of the present invention, there is provided a stand for a display device, including: a connecting member having a side to which the display device is supported, the connecting member being provided with a hinge and an insertion portion formed in a bar shape having a width that is gradually reduced in a direction; and a base on which the insertion portion is positioned, wherein a hook step is formed on a lower portion of the insertion portion; and the base includes a supporting member provided with a contraction hole in which the insertion portion is inserted; a supporting plate for fixing the supporting plate; an upper cover provided on an upper portion of the supporting plate; and a locking unit inserted in the lower portion of the supporting member by a predetermined depth, the locking unit rotating within a predetermined rotational angle range to selectively lock or unlock the insertion portion by allowing the insertion portion to be selectively engaged with the hook step.

In still yet another aspect of the present invention, there is provided a stand for a display device, including: a connecting member having a side fixed on a lower end of the display device; a base on which the connecting member is disposed; and a locking unit for fixing the connecting member to the base, wherein the base supports a load of the connecting member, and the locking member prevents the connecting member from being separated from the base when the connecting member is disposed on the base.

According to the stand of the present invention, the display device can be conveniently assembled and disassembled, the package volume can be reduced, and the shaking and damage of the display can be prevented when assembled.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
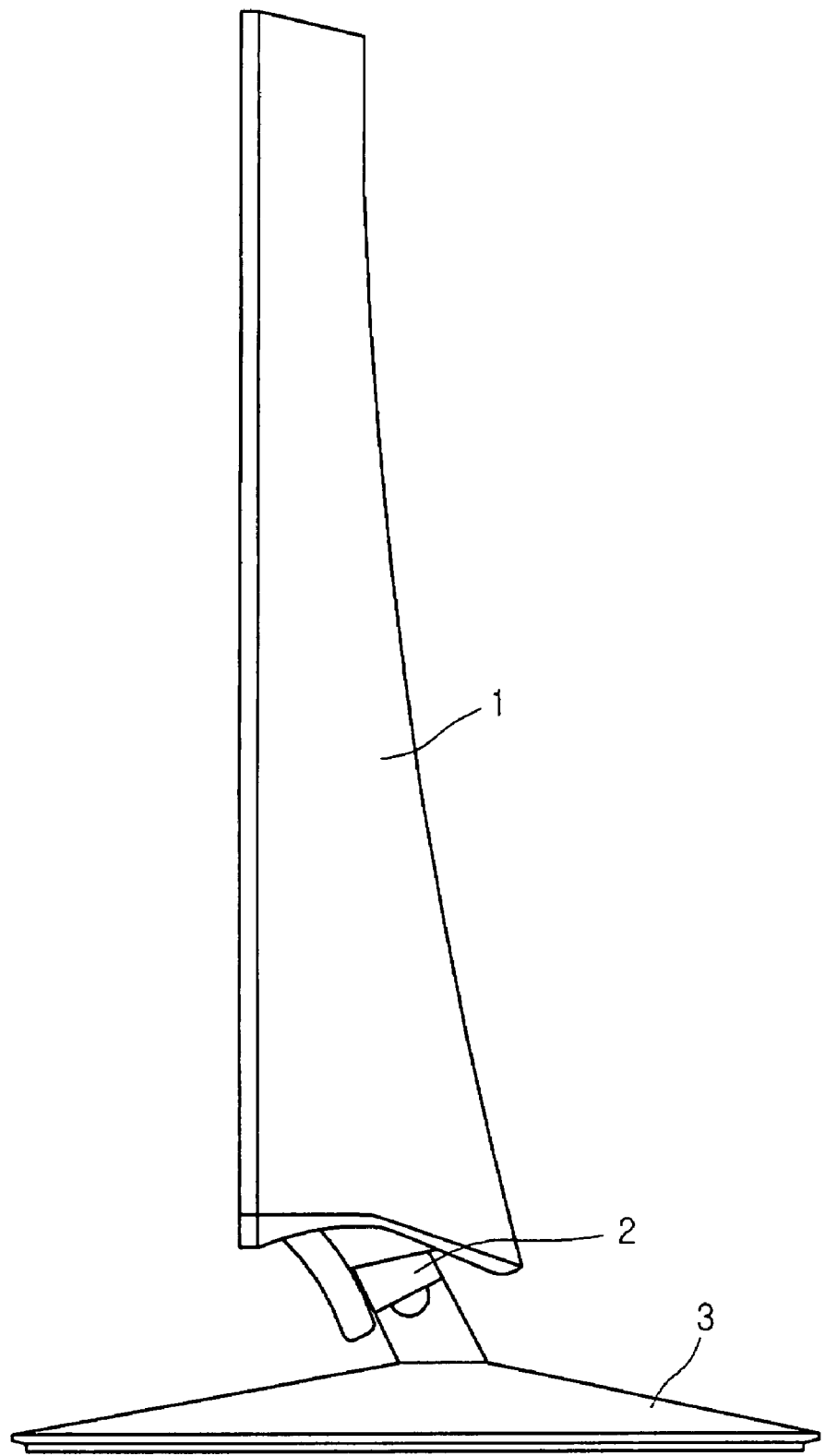
FIG. 1 is a side view of a display device and a stand according to an embodiment of the present invention, when they are assembled.
Figure 2:
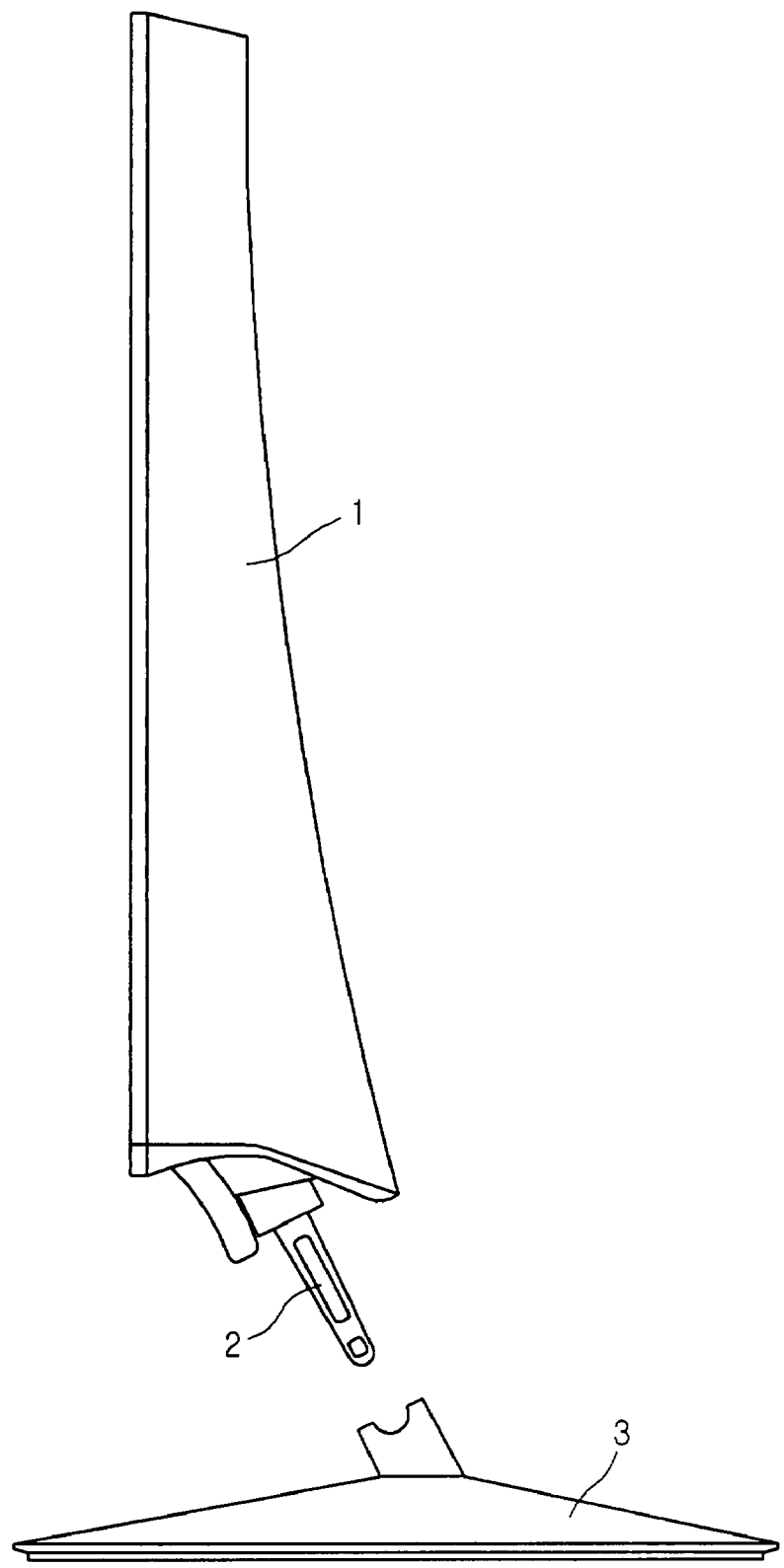
FIG. 2 is a side view of a display device and a stand according to an embodiment of the present invention, when they are dissembled.

FIG. 1 is a side view of a display device and a stand according to an embodiment of the present invention, when they are assembled and FIG. 2 is a side view of the display device and the stand when they are dissembled;

Referring to FIGS. 1 and 2, a connecting member 2 has a first end coupled to a lower portion of a display device 1. The connecting member 2 is inserted and fixed in the base 3.

A lower end of the connecting member 2 is in the form of a bar so that it can be inserted into the base 3 by a predetermined depth. This structure can prevent the shaking of the display device 1. By simply inserting the connecting member 2 into the base, it is very convenient. An upper end of the connecting member 2 is in the form of a surface so that it can be fixed on the display device 1 through screws.

Describing the connecting member 2 in more detail, the connecting member 2 is inserted in the base 3 to use the display device. The connecting member 2 is separated from the base 3 for the package. Since the package is done in a state where the connecting member 2 is separated from the base 3, they can be disposed at any place and thus the package volume can be reduced.

The following will described a mutual structure of the connecting member 2 and the base 3.

Figure 3:
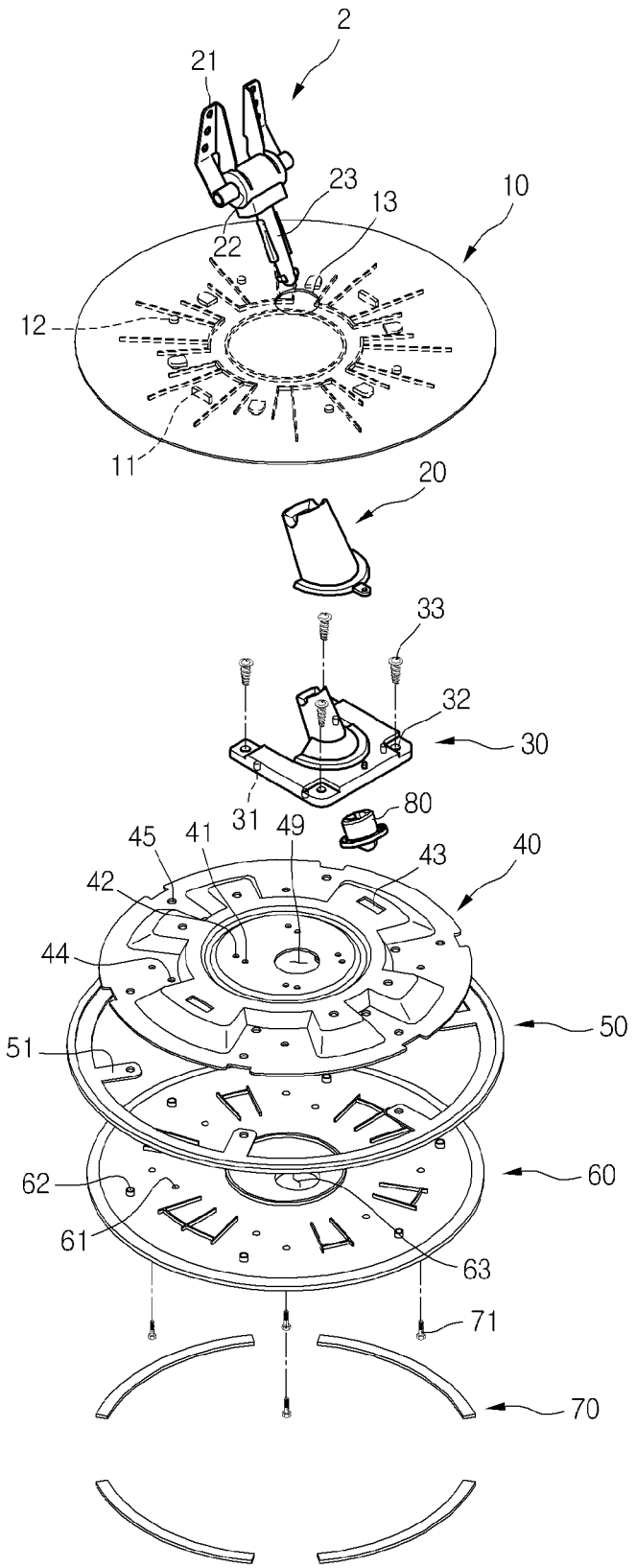
FIG. 3 is an exploded perspective view of a connection member and a base.

FIG. 3 is an exploded perspective view of the connecting member and the base.

Referring to FIG. 3, the connecting member 2 includes a display device fixing portion 21 fixed on a predetermined location of the display device 1, a wedge portion 23 inserted into the base 3, and a hinge 22 provided on a portion where the wedge portion 23 is connected to the fixing portion 21. The wedge portion 23 is a portion that will be inserted into the base 3 and thus it can be referred as an insertion portion.

The wedge portion 23 has a width that is gradually reduced downward so that a user can easily insert it into the base 3. The hinge 22 functions to provide an angle adjustment of the display device with respect to the base 3.

The base 3 includes a supporting plate 40 that is formed of metal to support strength of the base 3, a lower cover 60 that is provided under the supporting plate to provide a cover structure, a slipping preventing portion 70 that is fixed on the lower cover 60 to prevent the lower cover 60 from slipping, an upper cover 10 formed on an upper portion of the supporting plate, and a supporting member 30 in which the wedge portion 23 is inserted and fixed. The supporting member 30 is covered with a cover 20 formed of resin so that it cannot be exposed to an external side and tightly fitted in a hole 13 of the upper cover 10 when the supporting member 30 penetrates the upper cover 10 and protrudes upward. An edge ring 50 is further fixed on an edge of the supporting plate 40 so as to protect the edge of the base and prevent a parting line between the supporting plate 40 and the lower cover 60.

According to a feature of the present invention, a locking unit 80 is provided on a lower portion of the supporting member 30. After the wedge portion 23 is inserted, a lower end of the wedge 23 is locked by the locking unit 80 to prevent the wedge portion 23 from be separated upward of the supporting member 30. When it is intended to separate the stand, the wedge portion 23 is separated by manipulating the locking unit 80.

In addition, the wedge portion 23 and the supporting member 30 are formed of metal so that they can withstand the load of the display device 1.

The following will describe the coupling relationship between parts of the base 3.

In a state where a seating projection 31 formed on a bottom surface of the supporting member 30 is aligned with a guide hole 41 of the supporting plate 40, a first screw 33 is coupled by penetrating a fixing hole 32 of the supporting member 30 and a fixing hole 42 of the supporting plate 40. The edge ring 50 is shifted from the upper portion of the supporting plate 40 downward so that a seating portion of the edge ring 50 can be aligned with a seating guide 45. In this state, a body of the edge ring 50 is further shifted downward so that the edge ring 50 except for the seating portion 51 can be shifted to the lower portion of the supporting plate 40. As a result, the supporting plate 40 and the edge ring 50 are preliminarily assembled with each other by the fixing force between the seating portion 51 and the seating guide 45.

In the preliminary assembled state, the cover 20 is inserted into the supporting member 30. In addition, the supporting member 30 passes through the hole 13 formed in the upper cover 10. In this state, the fixing end 11 of the upper cover 10 is fitted in a hook portion 43. The fixing end 11 is a latch and thus, after the fixing end 11 is fitted in the hook portion 43, an upper cover 10 is assembled with the supporting plate 40.

Then, the locking unit 80 is inserted into the supporting member 30 through a lower opening after passing through a hole 49 formed on the supporting plate 40. In this state, the lower cover 60 is aligned with the upper cover 10. At this point, a plurality of slipping preventing portions 70 are fixed on the lower cover 60.

When the lower cover 60 is aligned with the upper cover 10 and other parts, the first fixing hole 61 of the lower cover 60, the second fixing hole 44 of the supporting plate 40, and the third fixing hole 12 of the upper cover 10 are aligned in a line. Then, a second screw 71 is inserted through the aligned fixing holes to securely fix the upper cover 10, the supporting plate 40, and the lower cover 60.

At this point, a fixing projection 62 formed on the lower cover 60 penetrates a hole formed in the seating portion 51 and a hole formed in the supporting plate 40, thereby more securely supporting the relative position of the edge ring 50. The locking portion 80 passes through a hole 49 formed in the supporting plate 40 but not into a concave portion (63 of FIG. 8) formed on the lower cover 60. Therefore, the locking unit 80 can rotate only at a fixed location of the supporting member 30. Nevertheless, a handle 88 of the locking unit 80 protrudes out of the concave portion 63 and thus the user can conveniently manipulate using the handle 88.

An interaction of the connecting member and the base will be briefly described with reference to FIG. 4.

Figure 4:
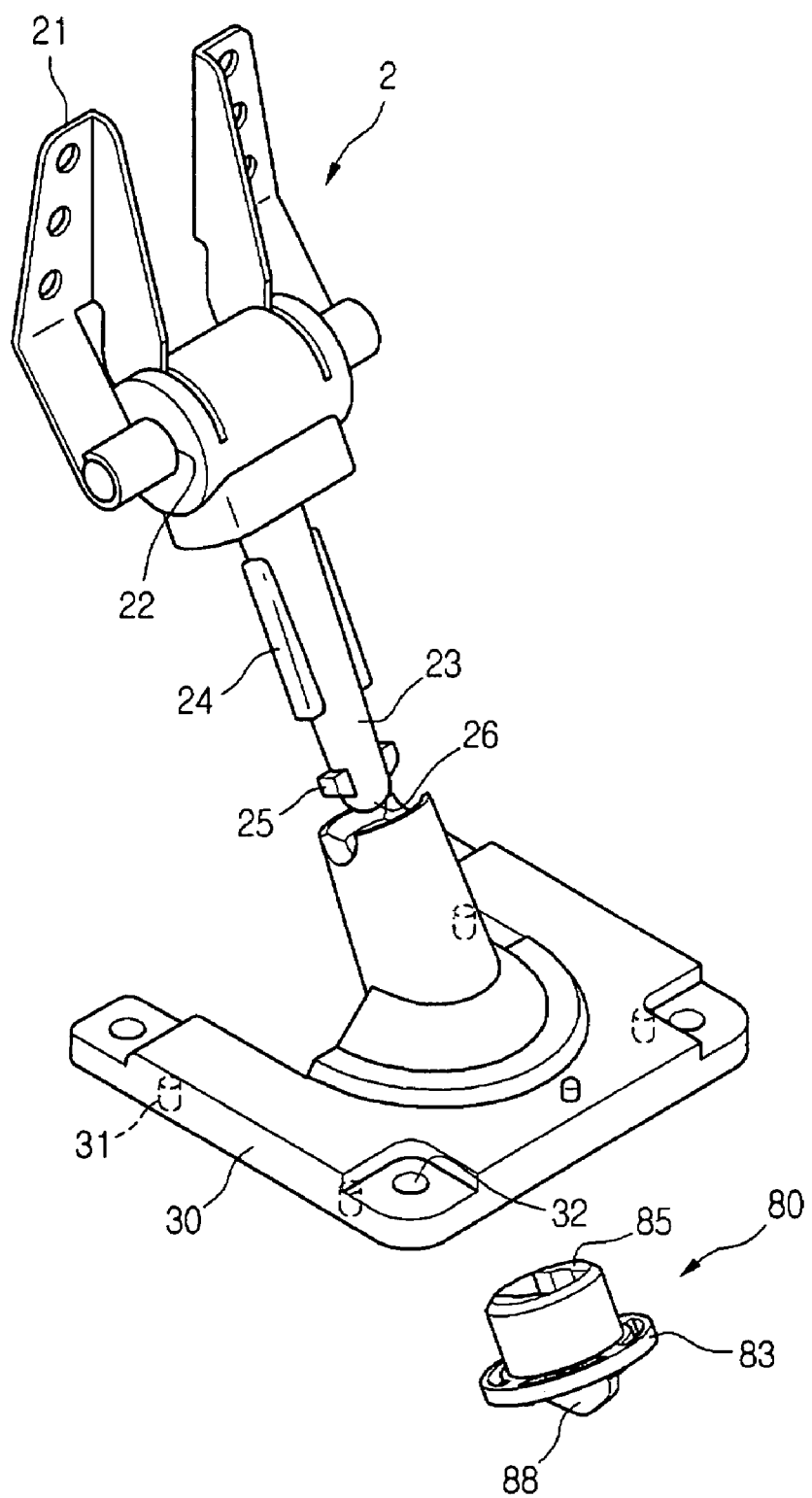
FIG. 4 is an exploded perspective view of an interaction of a connection member and a base.

Referring to FIG. 4, in order to make the wedge portion 23 non-circular shape, a projection 24 is formed on a side of the wedge portion 23 and a pair of hook steps 25 are formed on a lower end of the wedge portion 23 in a same manner as the projection 24. A circular end portion 26 is formed on the lower end of the wedge portion 23.

A contraction hole (26 of FIG. 8) is formed in the supporting member 40, having a shape corresponding to the shape of the wedge portion 23. That is, the contraction hole 36 has a diameter that is gradually reduced downward. Therefore, the wedge portion 23 is received in the contraction hole 36 of the supporting member 40, after which the rotation of the wedge portion 23 is prevented by the projection 24. By adjusting a side of the contraction hole 36 and the wedge portion 23 (since the supporting member and the wedge portion are formed of metal, the tolerance error thereof can be accurately controlled), the wedge portion 23 can be inserted by a predetermined depth.

The locking unit 80 is disposed in a lower-inner space of the supporting member 40. The locking unit 80 is provided with a hook step receiving space (86 of FIG. 5) in which the hook steps 25 are completely inserted and a contraction portion 85 for preventing the hook steps 25 from inadvertently separated.

By the above-described relationship, when the connecting member 2 is inserted in the supporting member 30, the connecting member 2 may be in a fixed or separable state depending on the rotation of the locking unit 80. The insertion operation of the connection member 2 is identically performed.

The following will describe the connecting member 2, the supporting member 30, the locking unit 80, and the lower cover 60 in more detail.

Figure 5:
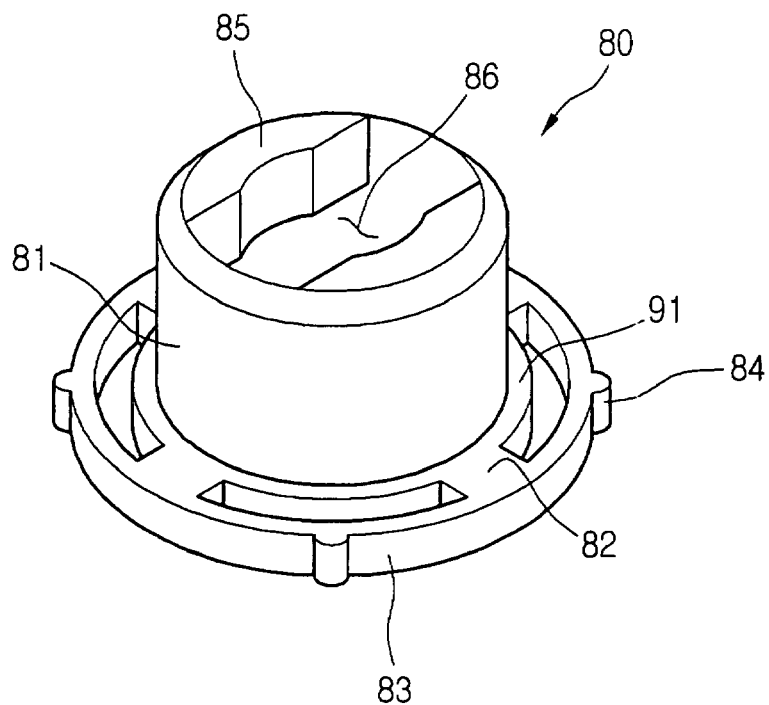
FIG. 5 is a top perspective view of a locking unit.
Figure 6:
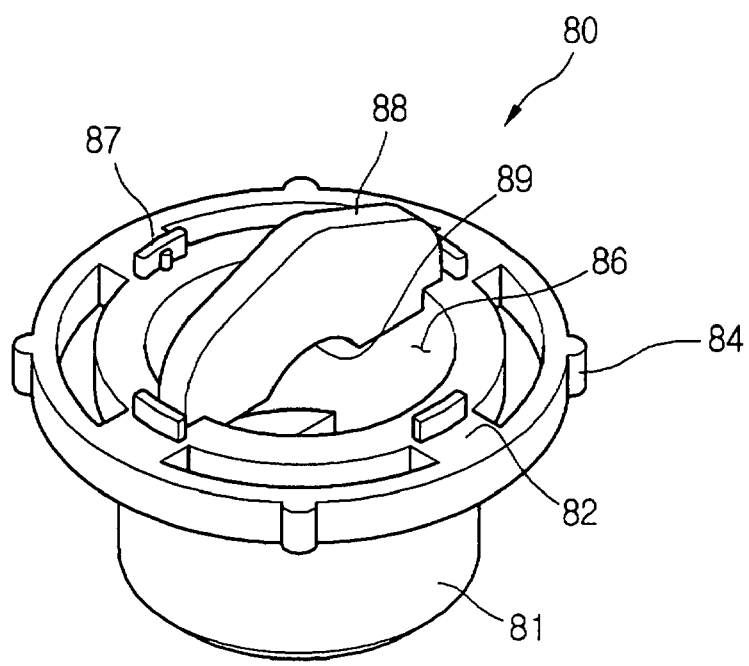
FIG. 6 is a bottom view of a locking unit.
Figure 7:
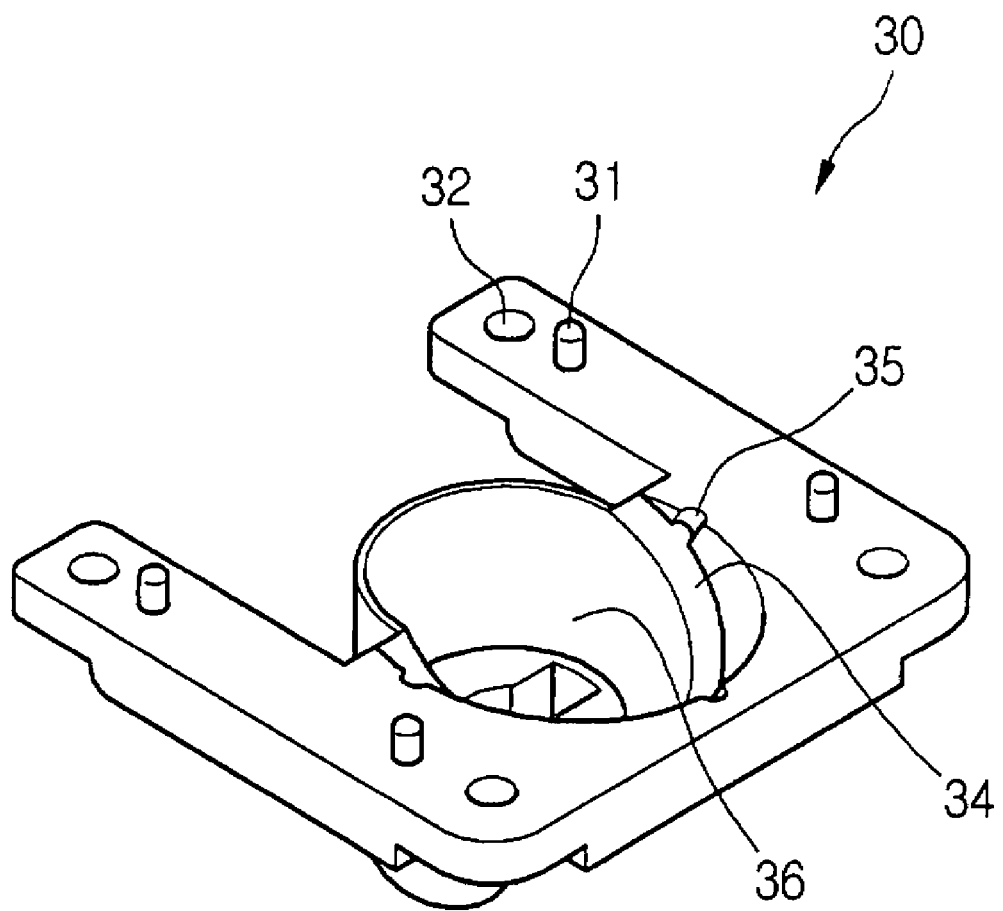
FIG. 7 is a bottom view of a supporting member.
Figure 8:
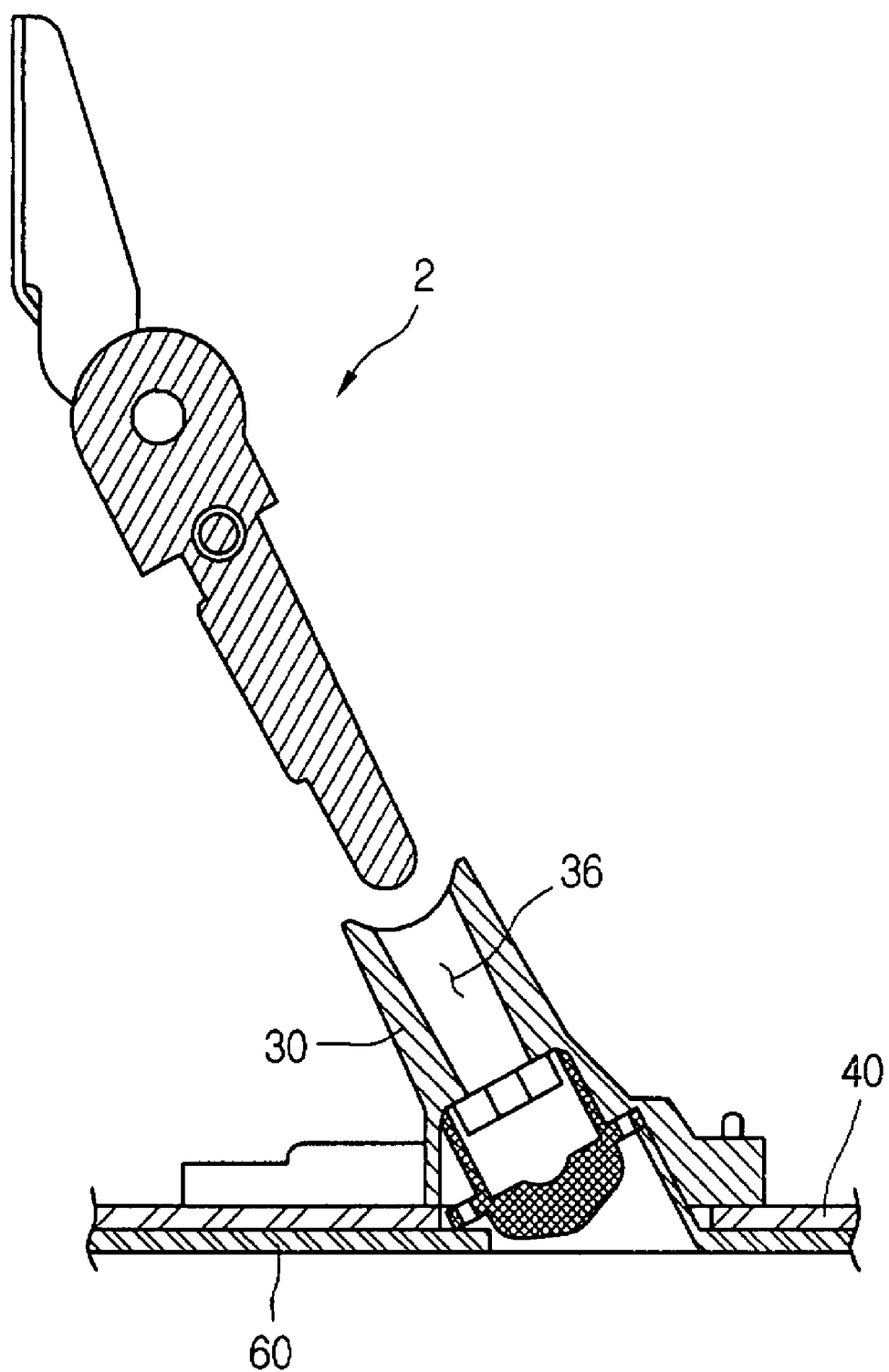
FIG. 8 is a sectional view of a connecting member, supporting member, a locking unit, and a lower cover.

FIG. 5 is a top perspective view of the locking unit, FIG. 6 is a bottom view of the locking unit, FIG. 7 is a bottom view of the supporting member, and FIG. 8 is a sectional view of the connecting member, supporting member, locking unit, and lower cover.

A wall 81 formed in a cylindrical pillar and provided with the hook step receiving space 86 is formed on an upper portion (see FIG. 5) of the locking unit 80. The contraction portion 85 is formed on an upper-inner side of the wall 81 at opposing sides. A circular edge 91 is formed on a lower outer side of the wall 81. A separation preventing ring 83 is formed at an outer side of the edge portion 91 by bridges 82 spaced apart from each other. Setting portions 84 are formed at an outer side of the separation preventing ring 83 and spaced apart from each other by 90°.

The locking unit 80 is provided at a lower portion with rotation guides 87 formed on a bottom surface of the bridges. The handle 88 is formed across the center of the locking unit 80 for allowing the user to rotate the locking unit 80 using the same.

Referring to FIG. 7, a locking unit seating surface 34 is formed on a lower portion of the supporting member 30 to support the edge portion 91 of the locking unit 80 and/or the separation preventing ring 83. Grooves 35 are formed on the locking unit seating surface 34 at an interval of 90°.

The mutual relationship of the parts will be described with reference to FIG. 8.

The rotational motion of an upper portion of the locking unit 80 is guided in a state where it is located on the locking unit seating surface 34. The lower portion of the locking unit 80 is hooked on the concave portion 63 so that it cannot be separated from the lower cover 60.

Furthermore, since the setting portions 84 and the grooves 35 are arranged at same intervals, the setting portion 84 and the grooves 35 are engaged with each other depending on the rotational angle of the locking unit 80. Therefore, the user can be noted the current locking position. For example, a position when there is a snap sound during the rotation of the locking unit 80 is a separable position of the connecting member and the other position when there is also a snap sound during the rotation of the locking unit 80 is a inseparable position of the connecting member. To this end, a relative position of the contraction portion 85, the setting portions 84, and the grooves 35 is set to be vertical or horizontal angle. When it is intended to fix and separate the connecting member 2 by rotating the locking unit 80 by 90°, the relative position is set to be vertical or horizontal angle. However, when it is intended to the fix and separate the connecting member 2 by rotating the locking unit by other angle, the relative position can be set to be other angles. The separation and fixture of the connecting member 2 results from the hooking operation between the hook steps 25 and the contraction portion 85.

Here, the setting portions 84 are formed between the pair of bridges 82 so that they can be easily inserted in the groove and thus elastically deform the separation preventing ring 83. However, the present invention is not limited to this configuration.

The rotation guide 87 is provided to be close to an inner wall of the concave portion 63 so that the locking unit 80 rotates within a predetermined range.

In addition, the handle 88 is designed to be completely received in an inner space of the concave portion 68 of the lower cover 60 so that the handle 88 does not contact a desk surface when the stand is supported by the lower cover 60.

The operation of the stand will now be described.

When the user purchases the display device and the stand, the stand and the display device are in a separated state. This is for reducing the package volume as described above. Therefore, the deliver costs can be significantly reduced.

Accordingly, after purchasing the display device, the user inserts the connecting member 2 into the supporting member 30. At this point, if the locking unit 80 is in a state disallowing for the insertion of the connecting member 2 into the supporting member 30, i.e., if the hook step is hooked on the contraction portion and thus the hook step cannot be inserted into the receiving space, the connecting member cannot be installed on the base. In this case, the user rotates the handle 88 to place the locking unit 80 in an insertion allowing state, i.e., to a state where the hook step is aligned with the contraction portion and thus the hook step can be inserted into the receiving space. In this state, the user inserts the connecting member into the base 3.

Here, when the wedge portion 23 is inserted into the supporting member 30, it is not inserted over a predetermined depth by the press-fitting of the wedge portion 23. The circular end portion 26 of the wedge portion contacts the seating surface 89 (See FIG. 6) of the locking unit 80 to smoothly guide the rotational motion of the locking unit 80. At this point, the both components are formed in corresponding circular shapes and thus the smooth mutual motion is realized.

At this point, the rotational motion of the locking can be snap-performed by the setting portions 84 and the grooves 35 and smoothly realized by the rotation guide 87.

Meanwhile, when the connecting member 2 is completely inserted into the base 3, the user further rotates the locking unit 80 so that the contraction portion 85 can be located in a direction perpendicular to the hook step 25. Then, even if the user pulls the connecting member, it is not separated by the hook step 25 hooked on the contraction portion 85.

The present invention can be realized according to following other embodiments.

The wedge portion 23 may not be gradually reduced in its width but designed having a uniform section. At this point, when the hook step 25 is formed on the lower end of the wedge portion 23, the above described operation can be normally performed. However, when the width of the wedge portion 23 is gradually reduced, the shaking of the display device can be effectively prevented and the insertion of the connecting member can be easily realized.

In addition, although the connecting member 2 is provided a single hinge rotate within a predetermined range, the present invention is not limited to this configuration.

According to the present invention, the user can easily assemble and disassemble the stand with the display device and the reliable operation for the stand can be provided.

In use, the shaking and damage of the display device can be prevented.

Furthermore, since the package volume can be reduced, the delivery and transportation costs can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device comprising:
   a connecting member having a side connected to the display device;
   an insertion portion extending downward from the connecting member;
   a hook step formed on the insertion portion;
   a supporting member provided with a space in which the insertion portion is inserted;
   a base for fixing the supporting member;
   a locking unit that is selectively aligned with the hook step to place the connecting member in a fixing or separable state in a state where the connecting member is disposed in the space;
   a setting portion formed on the locking unit; and
   a corresponding setting portion formed on the supporting member, which corresponds to the setting portion as the locking unit rotates, thereby allowing a user to identify a current rotating state of the locking unit,
   wherein the locking unit is rotatably provided with respect to the supporting member, and the locking unit comprises:
   a hook step receiving space in which the hook step is completely inserted; and
   a contraction portion allowing the hook step to be inserted into the hook step receiving space when the locking unit is at a predetermined angle with respect to the supporting member, and preventing the hook step from being inadvertently separated at an angle except when the locking unit is at the predetermined angle with respect to the supporting member.

2. The stand according to claim 1, wherein the locking unit rotates by a predetermined angle to engage or disengage the hook step.

3. The stand according to claim 1, wherein the locking unit is inserted upward into the base.

4. The stand according to claim 1, wherein the base includes a supporting plate formed of metal and fixing the supporting member.

5. The stand according to claim 1, wherein the locking unit fixes the connecting member by changing its alignment state with the hook step in a state where the hook step is received in the locking unit.

6. The stand according to claim 1, wherein the hook step is formed on a lower end of the insertion portion.

7. The stand according to claim 1, wherein a hinge is provided at a portion where the connecting member is connected to the display device.

8. The stand according to claim 1, wherein the connecting member is prevented from rotating when the connecting member is inserted into the supporting member.

9. The stand according to claim 1, wherein the locking unit is provided at a lower portion with a handle.

10. A stand for a display device, comprising:
    a connecting member having a side for supporting the display device;
    a base for supporting the connecting member;
    a locking member separated from the base and fixing the connecting member to fix the display device with respect to the base;
    a setting portion formed on the locking member; and
    a corresponding setting portion formed on the base, which corresponds to the setting portion formed on the locking member as the locking member rotates, thereby allowing a user to identify a current rotating state of the locking member,
    wherein the locking member is rotatably provided with respect to the supporting member, and wherein the locking member comprises:
    a hook step receiving space in which the hook step is completely inserted; and
    a contraction portion allowing the hook step to be inserted into the hook step receiving space when the locking member is at a predetermined angle with respect to the supporting member, and preventing the hook step from being inadvertently separated at an angle except when the locking member is at the predetermined angle with respect to the supporting member.

11. The stand according to claim 10, wherein the locking member is configured to lock and unlock the connecting member by rotation of the locking member.

12. The stand according to claim 10, wherein the locking member is inserted from a lower portion to an upper portion of the base.

13. The stand according to claim 10, wherein the connecting member is formed of metal and the base includes a supporting member formed of metal and supporting the connecting member.

14. The stand according to claim 10, wherein a hinge is provided at a portion where the display device is connected to the connecting member.

15. The stand according to claim 10, wherein the connecting member is supported on the base in a state that the connecting member extends downward and is inclined rearward by a predetermined angle with respect to the base.

16. The stand according to claim 10, wherein the connecting member is inserted in the base.

17. A stand for a display device, comprising:
    a connecting member having a side to which the display device is supported, the connecting member being provided with a hinge and an insertion portion formed in a bar shape having a width that is gradually reduced in a direction; and a base on which the insertion portion is positioned, wherein a hook step is formed on a lower portion of the insertion portion; and the base comprises:

a supporting member provided with a contraction hole in which the insertion portion is inserted;

a supporting plate for fixing the supporting member;

an upper cover provided on an upper portion of the supporting plate; and a locking unit inserted in a lower portion of the supporting member by a predetermined depth, the locking unit rotating within a predetermined rotational angle range to selectively lock or unlock the insertion portion by allowing the insertion portion to be selectively engaged with the locking unit.

18. The stand according to claim 17, wherein the supporting plate is provided with a lower cover in which a handle of the locking unit is received.

19. The stand according to claim 17, wherein the locking unit is not separated downward by being hooked on the lower cover.

* * * * *